H. E. GILBERT.
TEMPERATURE REGULATOR FOR FURNACES.
APPLICATION FILED DEC. 9, 1914.
1,177,858.
Patented Apr. 4, 1916.
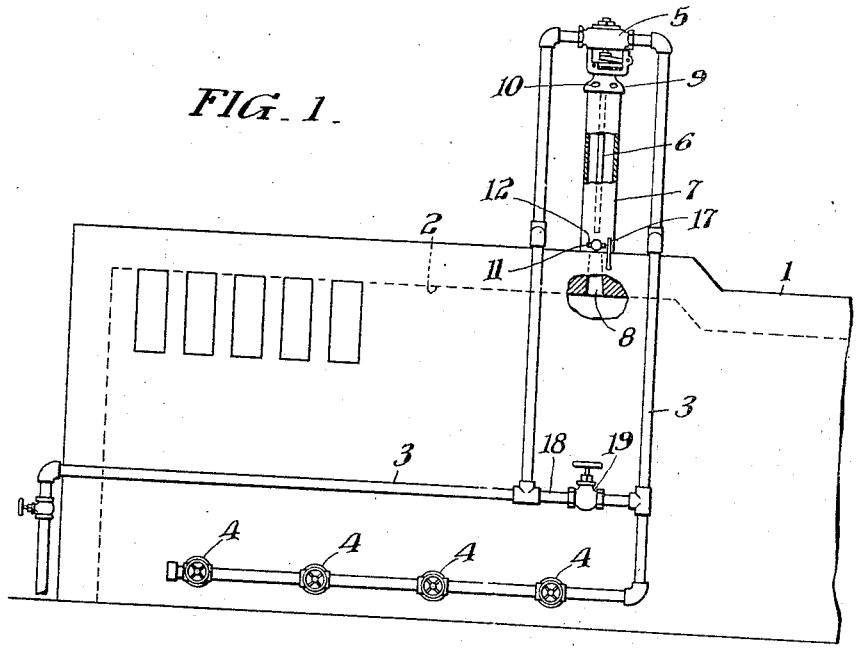
FIG. 1.
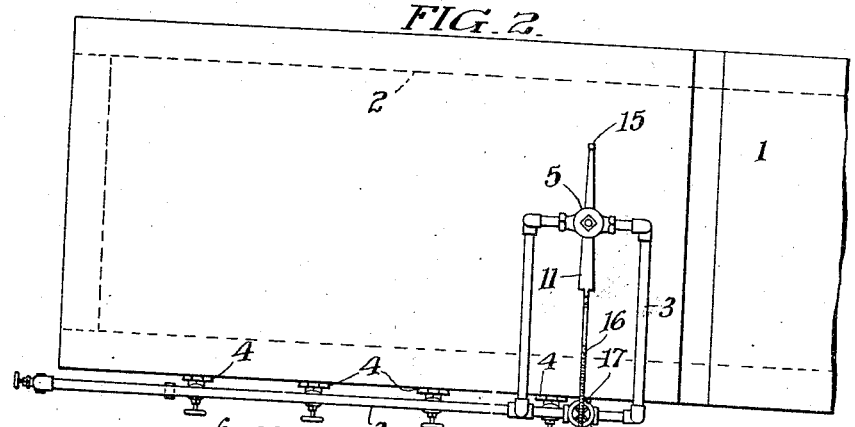
FIG. 2.
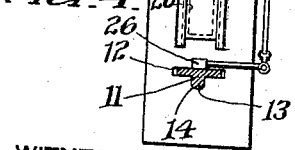
FIG. 4.
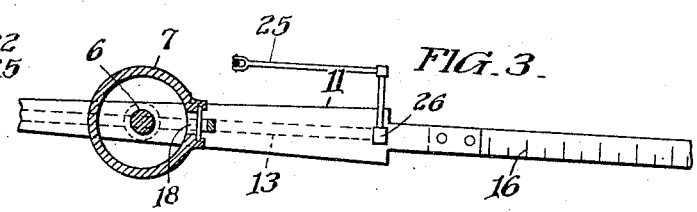
FIG. 3.
WITNESSES
Daniel Webster Jr.
E. W. Smith
INVENTOR
Harry E. Gilbert
BY
ATTORNEY

UNITED STATES PATENT OFFICE.

HARRY E. GILBERT, OF CONSHOHOCKEN, PENNSYLVANIA.

TEMPERATURE-REGULATOR FOR FURNACES.

1,177,858.      Specification of Letters Patent.      Patented Apr. 4, 1916.

Application filed December 9, 1914. Serial No. 876,259.

*To all whom it may concern:*

Be it known that I, HARRY E. GILBERT, a citizen of the United States, and resident of Conshohocken, county of Montgomery, and State of Pennsylvania, have invented an Improvement in Temperature-Regulators for Furnaces, of which the following is a specification.

This invention relates to a gas regulator for gas heated furnaces and consists of certain improvements which are fully set forth in the following specification and shown in the accompanying drawings which form a part thereof.

The object of the invention is to provide a means for automatically maintaining the temperature of a furnace substantially constant under conditions of use, whereby a uniform heat is obtained for use in processes requiring a substantially even and accurate temperature.

It has for a further object to provide a means for varying the temperature of a gas furnace according to requirements in such a manner that after the required or predetermined temperature has been obtained, the furnace will continue its operation and maintain the required temperature substantially constant.

The object of my invention, more specifically stated, is to automatically control the fuel or heating medium of a furnace of any description by the employment of a thermostatically operated means, the thermostat thereof being subjected to a slowly circulating heated atmosphere deriving its heat from the furnace, the supply of heated gases to the thermostat being more free than the escape of said gases from the vicinity thereof, so that the thermostat is affected by an atmosphere of heated gases of a temperature greatly less than that of the furnace and changing in temperature commensurately with the changes of temperature of the furnace, to control the fuel or heating medium supplied to the furnace, and to control the speed of circulation or change of the heated atmosphere about the thermostat by deflecting gases (arising from the furnace) away from the thermostat, said control of the heated gases acting on the thermostat being predetermined and effected preferably by manually operated means.

My invention consists of features of construction which are fully described hereinafter and more fully defined in the claims.

Referring to the drawings: Figure 1 is a side elevation of a furnace with my improvements applied thereto; Fig. 2 is a plan view thereof; Fig. 3 is a sectional plan view of a portion of the regulating devices showing another embodiment of the invention for controlling the admission of air to the thermostat casing; and Fig. 4 is an elevation of a portion of the temperature controlling devices shown in Fig. 3.

In the present instance the invention is illustrated as applied to a glass leer employing gas as a fuel; though it will be understood this is only by way of example since it is adapted for a wide range of use as a temperature regulator.

1 designates the setting of the leer having the furnace or combustion chamber 2 indicated in dotted lines. The gas supply is obtained from a suitable main and passes by way of the pipe 3 to the main burners 4 which are of any desired type and located in suitable operative relation to the combustion chamber.

5 designates a valve located in the supply pipe 3 and adapted to be automatically controlled by a thermostatic element 6, this latter being of any suitable construction for causing the valve 5 to operate under variations in the temperature. The operating connections between this thermostatic element and the valve 5 are indicated only diagrammatically since they form no part of the present invention, and any type of transmitting means may be employed. The thermostatic element, as here shown, is inclosed in a tubular casing 7 mounted upon the furnace setting and having communication with the interior by way of the port 8 of the combustion chamber 2, so that a portion of the hot products pass around the thermostat 6. The opposite end of the casing 7 is provided with a suitable closure 9 having openings 10 therein through which the gases may escape to the outside of the casing. The port 8 is preferably comparatively small in size, so as not to allow a too free flow from the furnace, and serves to by-pass a certain portion of the hot products upwardly through the casing 7 and around the thermostatic element 6, whereby the latter is directly controlled by the temperature of the furnace gases. The escape or vent openings 10 in the top of the casing 7 are preferably relatively smaller than the furnace opening 8 to the casing, so that the hot gases are retained in the casing under a slight pressure but permit the cooler portion of the gases at the top to be constantly escaping as hotter gases rise up into the casing to take their place. It will thus be apparent that an increase in the temperature of these gases above the predetermined required temperature brings the thermostat into operation to close or partly close the valve 5 so that the supply of fuel to the main burners 4 is correspondingly cut down, therefore resulting in a lowering of the temperature in the furnace chamber. In case the temperature of the furnace gases drops below the required temperature the reverse of the foregoing conditions takes place, the valve 5 being then opened, and a greater amount of gas fed to the burner.

By the construction described, it is manifest that the exceedingly high temperature of the furnace may be regulated without inserting the thermostatic element into it, and this is so because the small portion of the gases which are allowed to pass to the casing containing the thermostatic element are so governed that changes in its temperature are proportional to the changes in temperature of the gases within the furnace itself. The thermostatic element could not withstand the high temperature of the furnace, but by my improvements it is enabled to accurately cause the regulation of the temperature of the furnace itself.

In order to vary or change the fixed temperature of the furnace I have provided a means for cutting down or increasing, as the case may be, the quantity of heated products so that the thermostat operates in a different timed relation. This means, in the present instance, consists of a regulating slide bar 11, preferably tapered longitudinally and adapted to seat and have sliding movement within openings 12 located respectively at opposite sides of the casing 7. In order to properly guide this bar it is provided with a flange 13 seating within a grooved portion 14 of the casing, so that the bar is accurately centered and positioned for effective work. A lug 15 may be provided at one end of the rod to prevent the said rod from being completely withdrawn or detached from the casing 7. The operative position of the bar 11 is between the port 8 and the end of the thermostatic element so that in effect it serves the purpose of a baffle or cut-off to deflect the gaseous products outwardly toward the side of the casing 7 and away from the thermostatic element. This bar 11 also acts in a measure as a valve to restrict the upward flow of the hot gases for it reduces or increases the area of the passage within the casing 7 according to its adjustment. In case the bar 11 is drawn out to its fullest extent the small tapered end thereof is interposed between the port 8 and the thermostatic element and the maximum freedom of supply of heated products through the casing 7 into contact with the thermostatic element 6 is permitted. As the bar is moved inwardly this freedom of supply is gradually cut down until the bar reaches the position where its widest portion is interposed, at which time a minimum freedom of supply of the gas products into the casing 7 and around the thermostatic member is permitted. The hot gases which pass up into the casing 7 ultimately pass out through the small openings 10 at the top, but the current of the gases is relatively slow so that a condition of radiant heat is effective in energizing the thermostatic member. When the bar 11 is employed to check the direct flow of the hot gases near the thermostatic element, said element is affected to a correspondingly less extent than when the hot gases are permitted a more free passage upward and into more direct contact with the thermostatic element. In order to accurately determine the position of the slide bar 11 for different controlling temperatures I have preferably graduated an extension of the same, as shown at 16, to represent temperature changes and also provided an indicator 17 suitably mounted upon a fixed part of the furnace and extending into operative relation to the slide bar 11, as will be understood.

In starting the heating of the furnace it may be desired to supply the gas to the burners 4 regardless of any regulation, and for this purpose I have provided a by-pass 18, around the control valve 5, said by-pass having a hand controlled valve 19 therein so that it may be used when desired. When the furnace is heated, the by-pass valve 19 may be shut off and the furnace temperature then regulated by use of my thermostatic improvements.

It may be desirable in some instances, more especially where the furnace temperature is very high, to provide a means for more sensitively controlling the actuation of the thermostat and consequently varying the supply of gas more promptly. In the present instance I have shown in Figs. 3 and 4 such a means, wherein 20 designates an opening through the wall of the casing 7 and located adjacent the lower end thereof, which opening is adapted to be controlled by a slide valve member 21. This valve member is suitably mounted for sliding movement in the guides 22 and at one end is connected to a bell crank 23 which is actuated by the rock spindle 24. Motion is transmitted to the spindle 24 by means of a crank arm 25 having its opposite end secured to the rod 11 as shown at 26. It will thus be apparent that movement of the rod in one direction or the other will simultaneously raise or lower the slide valve 21 and thus act to open or close the opening 20. The adjustment of these parts is such as to cause a proportionate regulation of the opening 20 relative to the position of the control slide bar 11. In this case the rising heat products are deflected from the casing 7 into the atmosphere, the valve opening 20 providing more easy escape than the small holes 10 at the top of the casing, and the bar 11 may be considered as the manual means for operating the valve 21. This valve 21 may be of any other suitable form and manually adjusted by any other operative means in lieu of that shown. If there is an overabundance of heat in the gases from the furnace, the objectionable excess may be allowed to escape from the casing 7 through the opening 20, so that an excessive heat will not reach the thermostatic member. By employing this valve controlled opening, the regulation is effected more rapidly and hence the temperature of the furnace is more constant. By this construction it is obvious the temperature of the furnace may be quickly changed from one temperature to another, after which conditions are promptly returned to normal so that the desired temperature may then be maintained substantially constant.

In the operation of the device, to maintain the predetermined temperature, the slide bar 11 is manually moved to the position desired to impede and deflect to the proper extent the heated products passing through the thermostat casing 7, in accordance with the required regulation for the temperature to be maintained in the furnace. Having effected this adjustment, the device automatically controls and regulates the heat to the thermostatic element so that the heated furnace is maintained at the required constant temperature. Should this temperature be exceeded, owing to an excess amount of gas being supplied to the burners 4, the rise in the temperature of the hot products passing through the casing 7 will cause the thermostat to expand and thus operate the valve 5 to cut down the supply to the burners. Under reverse conditions, that is, a lowering of the temperature, the thermostat contracts so that the valve 5 is opened and the supply of gas to the burner 4 correspondingly increased. In this way the predetermined temperature is maintained substantially constant within the furnace; and this desired temperature may be higher or lower as required by simply adjusting the bar 11 to suit the requirements. As before pointed out, this regulation may be supplemented by controlling the opening 20 by the valve 21 to make the apparatus more sensitive, especially in cases where the furnace temperature is high. By permitting a continual escape of the hot gases from the opening 20 and causing a relatively less volume to pass to the thermostatic element 6, the latter will be more sensitive to temperature changes and the resulting regulation will be more responsive and the maintenance of the temperature more constant.

While I have referred to pipe 3 as a gas pipe it may be employed to supply oil to the burners and therefore it may be considered as a fuel pipe, irrespective of the character of fuel employed.

It will now be apparent that I have devised a complete unitary structure suitable for a furnace, and wherein the parts are automatically controlled to maintain a constant temperature in the furnace, and furthermore, in which this constant temperature may be maintained at a higher or lower degree at will by adjusting the location of the slide bar 11 to meet the conditions desired.

In this application no claim is made to the method of operation herein described, as the same is reserved for a separate application.

Having now described my invention, what I claim as new and desire to protect by Letters Patent is:—

1. In a device of the character stated, a furnace in combination with a casing having communication with the combustion chamber of the furnace to provide for a restricted circulation of a portion of the heated products therefrom through said casing, a thermostat mounted in said casing, a fuel supply pipe operatively connected to the burners of said furnace, a valve in said fuel pipe and controlled by said thermostat, and means for varying the quantity of heat passing through said casing in contact with the thermostat by deflecting a portion of heated products out of the circulation before reaching the thermostat.

2. In a device of the character stated, a furnace in combination with a casing having communication with the combustion chamber of the furnace to provide for a restricted circulation of a portion of the heated products therefrom through said casing, a thermostat mounted in said casing, a fuel supply pipe operatively connected to the burners of said furnace, a valve in said fuel pipe controlled by said thermostat, and an adjustable regulating valve device between said thermostat and the inlet for the heated products to said casing for releasing a portion of the heated products to a point outside of the casing and thereby varying the quantity of heat passing through said casing in contact with the thermostat, whereby the temperature of said furnace may be regulated according to requirements.

3. In a device of the character stated, the combination of a furnace, a fuel supply therefor, means controlled wholly by the temperature of the heated products from said furnace and independent of atmospheric conditions for varying said fuel supply to maintain a constant temperature in said furnace, and manually controlled devices to deflect a portion of the heated products from said means into the atmosphere for changing the predetermined temperature of the furnace to be maintained.

4. In a device of the character stated, a furnace combined with a casing having communication with the combustion chamber of the furnace to provide for a restricted circulation of a portion of the heated products therefrom through said casing, said casing also being provided with side openings arranged in alinement and located adjacent the lower and inlet portion to said casing, a thermostat mounted in said casing above said openings, a fuel supply pipe operatively connected to the burners of said furnace, a valve in said pipe controlled by said thermostat, and a tapered bar slidably mounted in said casing openings and arranged below the thermostat to deflect and retard the circulation of the heated products.

5. In a device of the character stated, a furnace, in combination with a casing having communication with the combustion chamber of the furnace and providing a restricted circulation of a portion of the heated products therefrom through said casing, a thermostat mounted in said casing at its upper portion, means to supply fuel to the furnace, means to regulate the supply of fuel controlled by the thermostat, and adjustable means for causing a portion of the heated products to be removed away from the thermostat, whereby the thermostat is affected wholly by the heated products from the furnace to a greater or less predetermined degree and unaffected by the varying atmospheric changes of temperature.

6. In a device of the character stated, a furnace, in combination with a casing separate from the furnace and entirely out of the general circulation of the products of combustion thereof and having a conduit leading therefrom to provide a restricted circulation of a relatively small quantity of a heated medium through the casing said medium of relatively low temperature and deriving its heat from the furnace and of a temperature greatly below that of the furnace, a thermostat mounted in said casing and under the influence of the relatively low temperature heated medium having the restricted circulation within said casing, means to regulate the heat of the furnace controlled by the thermostat, and manually controlled adjustable means for changing the speed of restricted circulation of the low temperature heated medium about the thermostat, whereby the temperature of the furnace may be predetermined and maintained constant.

7. In a device of the character stated, a furnace, in combination with a casing outside of the furnace proper but having communication therewith to provide for a restricted circulation through the casing of a small quantity of heated gaseous medium deriving its heat from the furnace, a thermostat mounted in said casing, means controlled by the thermostat to regulate the fuel supply to said furnace to maintain a substantially constant temperature therein, manually controlled means, and adjustable means actuated by the manually controlled means for changing the predetermined temperature of the furnace which is to be maintained said adjustable means comprising devices for diverting a greater or less portion of the circulating heated medium away from contact with the thermostat whereby only a portion of the heated medium from the furnace is circulated over the thermostat.

8. In a device of the character stated, a furnace, in combination with a casing separate from the furnace proper and entirely outside of the general circulatory system for the products of combustion therefrom so as to have a relatively low temperature but through which casing a small quantity of a heated gaseous medium deriving its heat from the furnace is circulated, a thermostat mounted in the casing and subjected to the heat of the circulating gaseous medium but wholly removed from the high temperature of the circulatory system of the heated products from the furnace, means controlled by the thermostat to regulate the fuel supply to the furnace, and means for diverting a portion of the heated gaseous medium received from the furnace to a point outside of the casing before it reaches the thermostat for controlling the speed of circulation of the heated gaseous medium in contact with the thermostat, whereby the temperature of the furnace may be predetermined and maintained constant.

In testimony of which invention I hereunto set my hand.

HARRY E. GILBERT.

Witnesses:
  C. H. WISSMANN,
  FLORENCE DEACON.